Sept. 26, 1950 L. J. MAXSON ET AL 2,523,314
FLUSH DECK CATAPULT
Filed Feb. 8, 1938 7 Sheets-Sheet 1

INVENTORS
LISLE J. MAXSON
BY FREDERICK B. GROSS
Ransom H. Davis
ATTORNEY

Sept. 26, 1950 L. J. MAXSON ET AL 2,523,314
FLUSH DECK CATAPULT
Filed Feb. 8, 1938 7 Sheets-Sheet 2

INVENTORS
LISLE J. MAXSON
BY FREDERICK B. GROSS

Ransom H. Davis
ATTORNEY

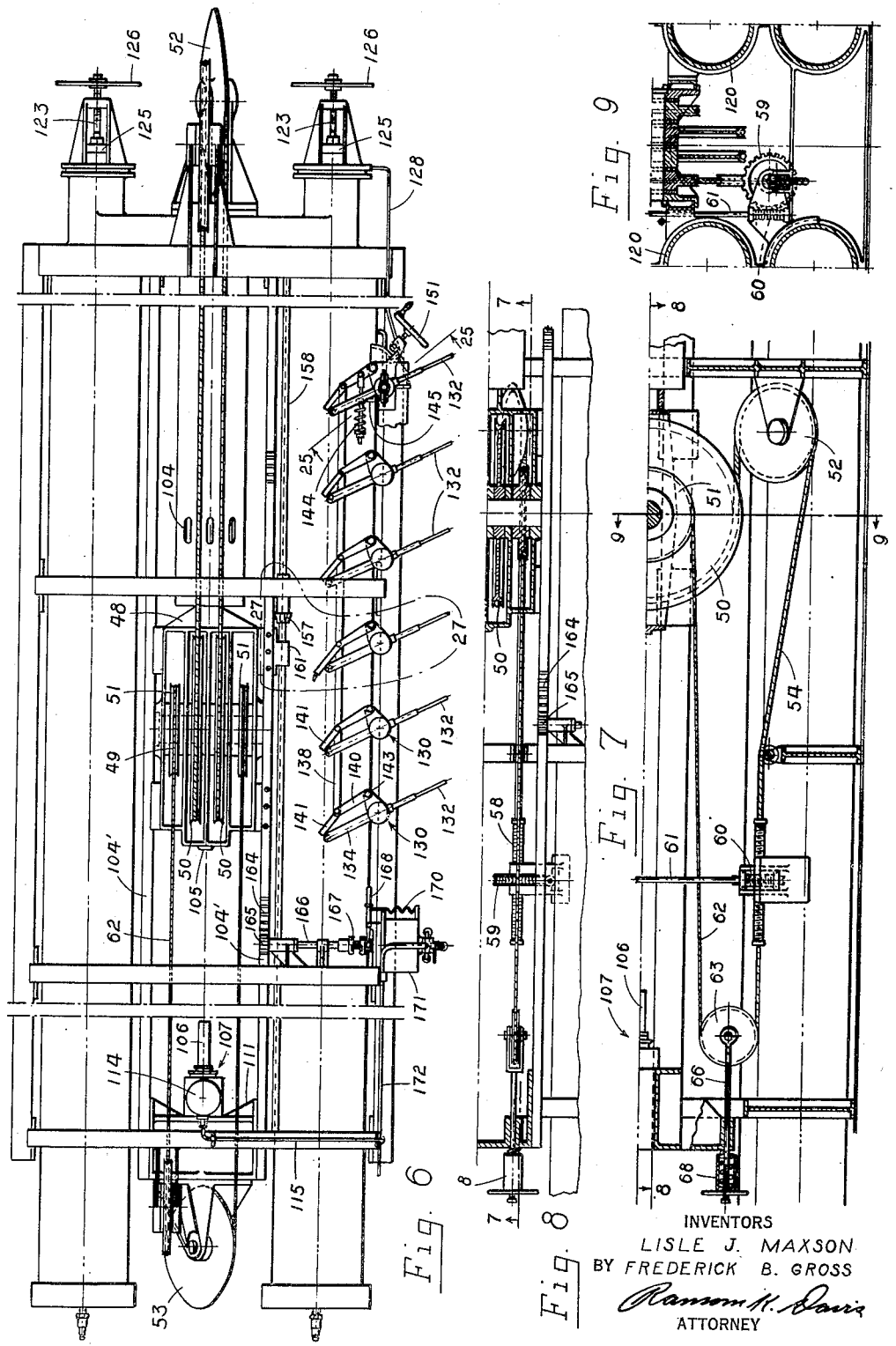

Sept. 26, 1950 L. J. MAXSON ET AL 2,523,314
FLUSH DECK CATAPULT
Filed Feb. 8, 1938 7 Sheets-Sheet 4
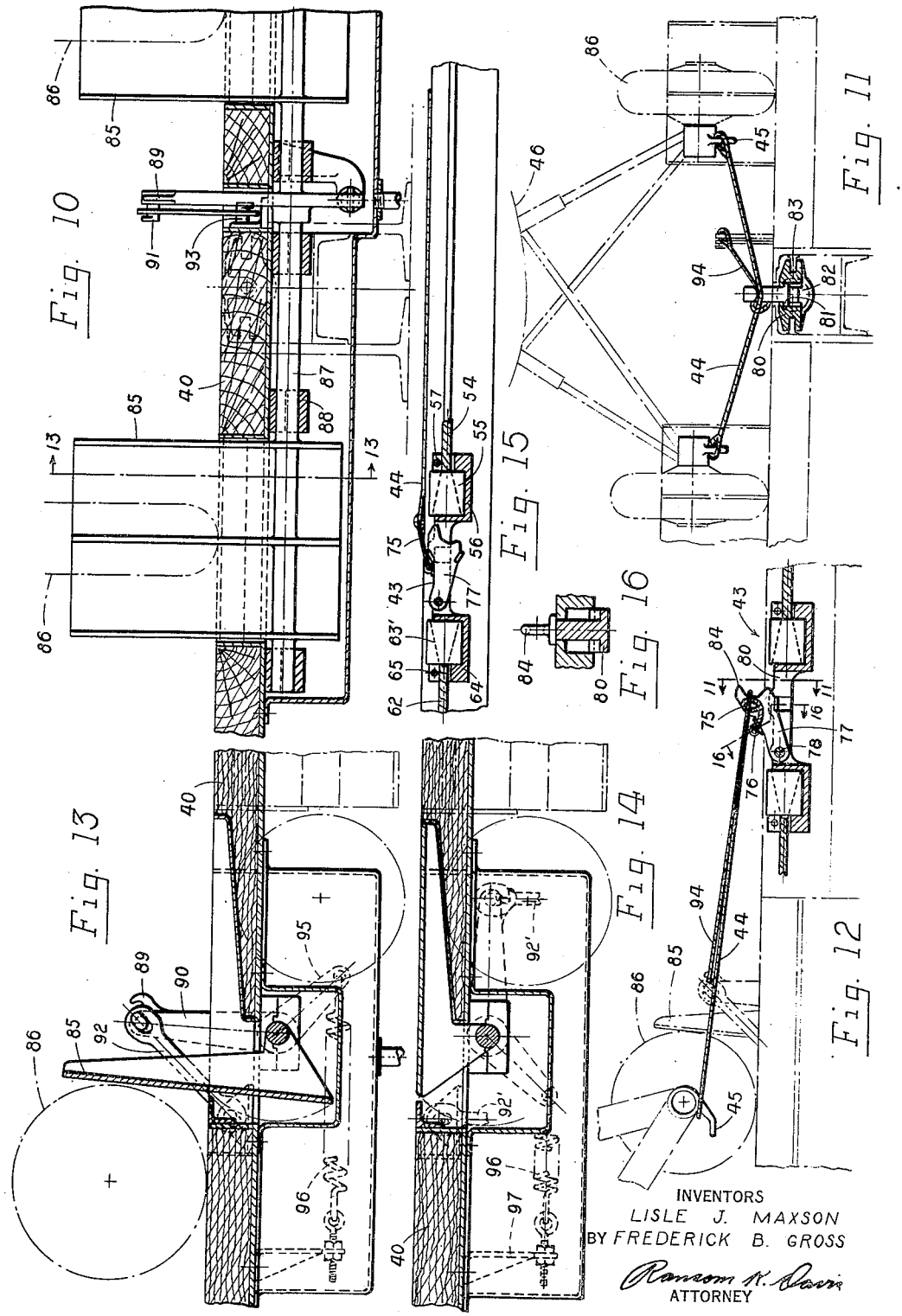
INVENTORS
LISLE J. MAXSON
BY FREDERICK B. GROSS
Ransom K. Davis
ATTORNEY

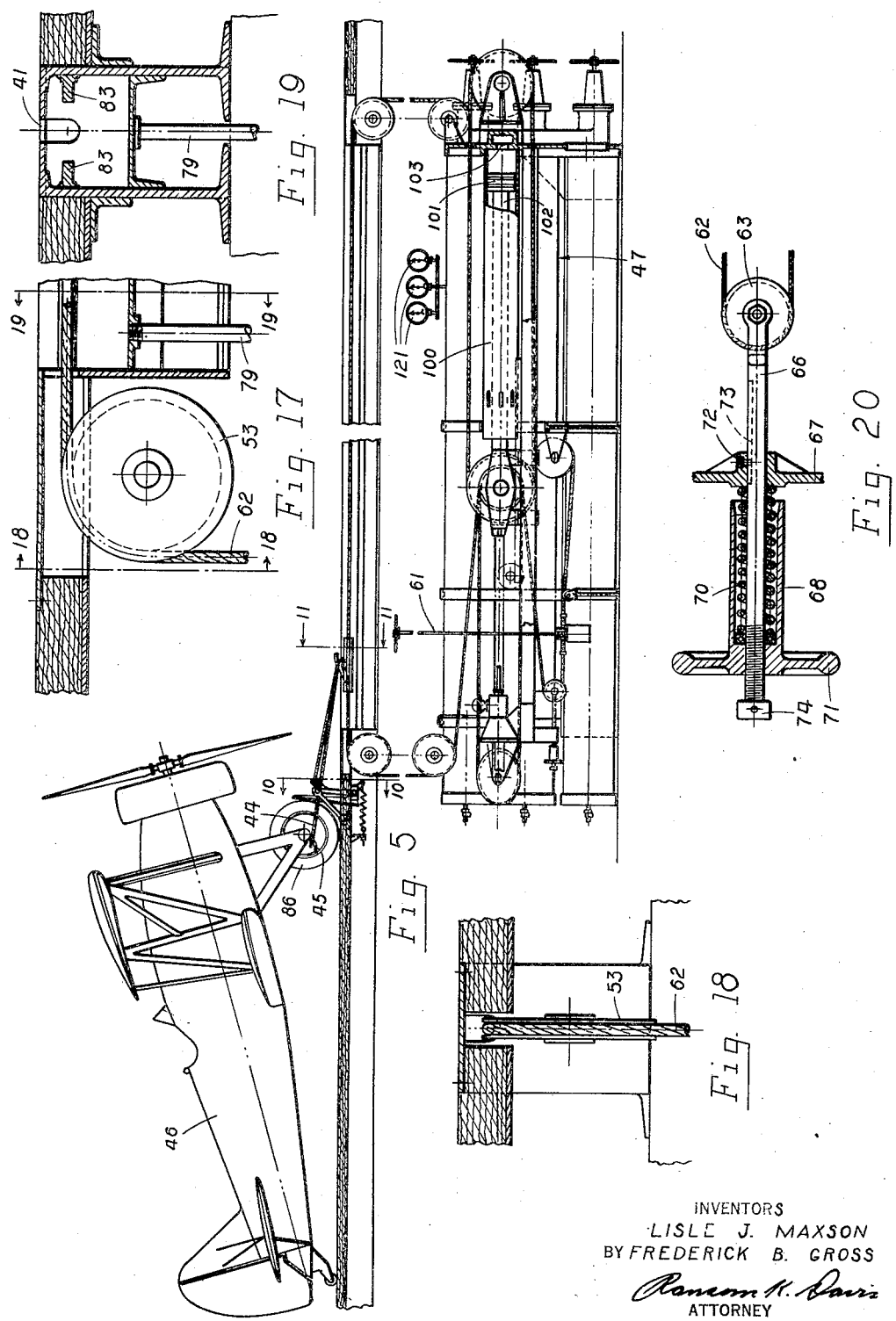

Sept. 26, 1950 L. J. MAXSON ET AL 2,523,314
FLUSH DECK CATAPULT
Filed Feb. 8, 1938 7 Sheets-Sheet 6
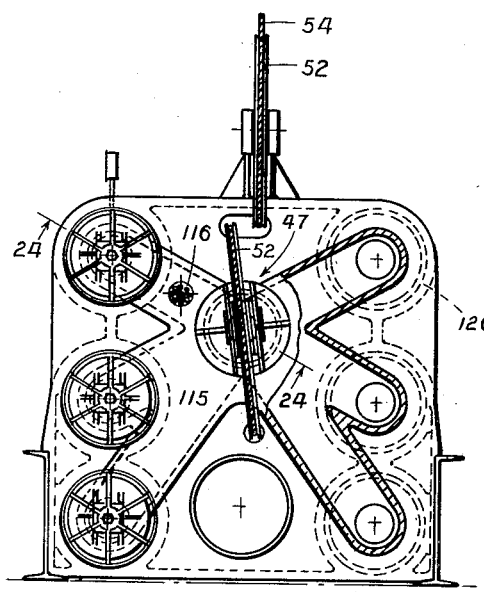
Fig. 23
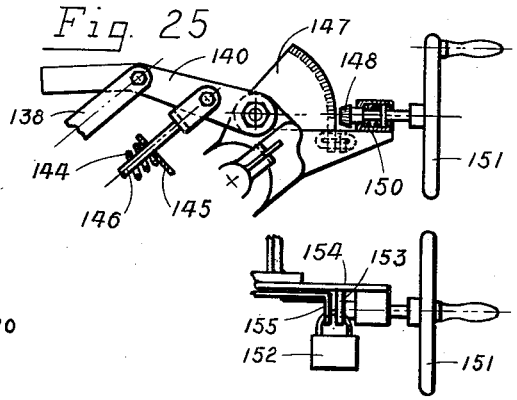
Fig. 25
Fig. 26
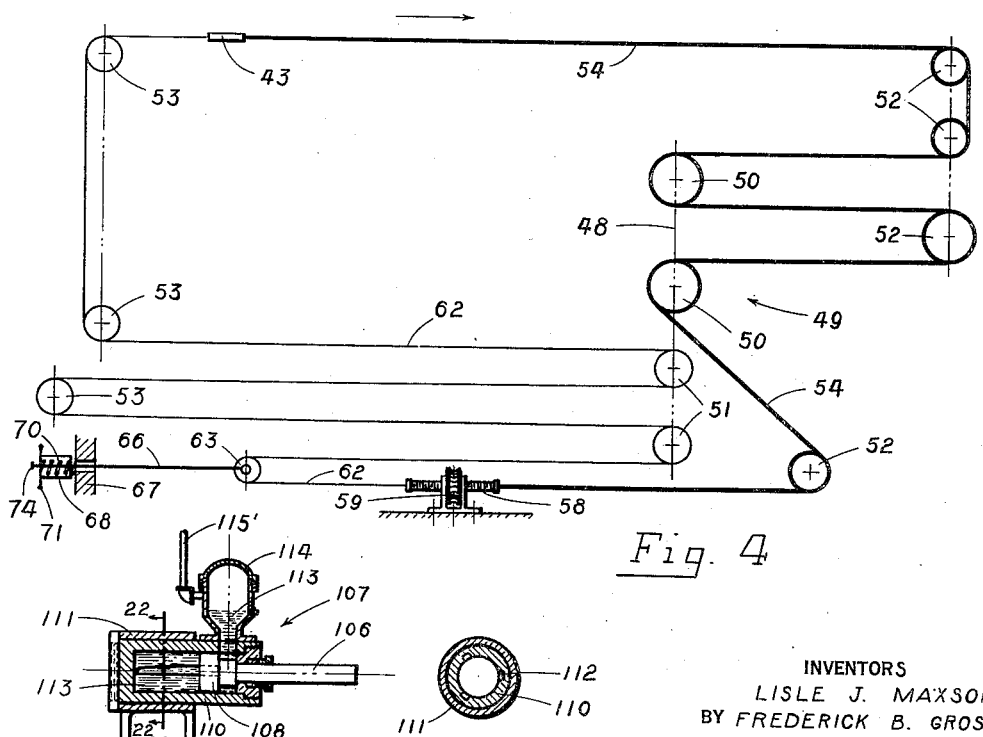
Fig. 4
Fig. 21  Fig. 22
INVENTORS
LISLE J. MAXSON
BY FREDERICK B. GROSS
ATTORNEY

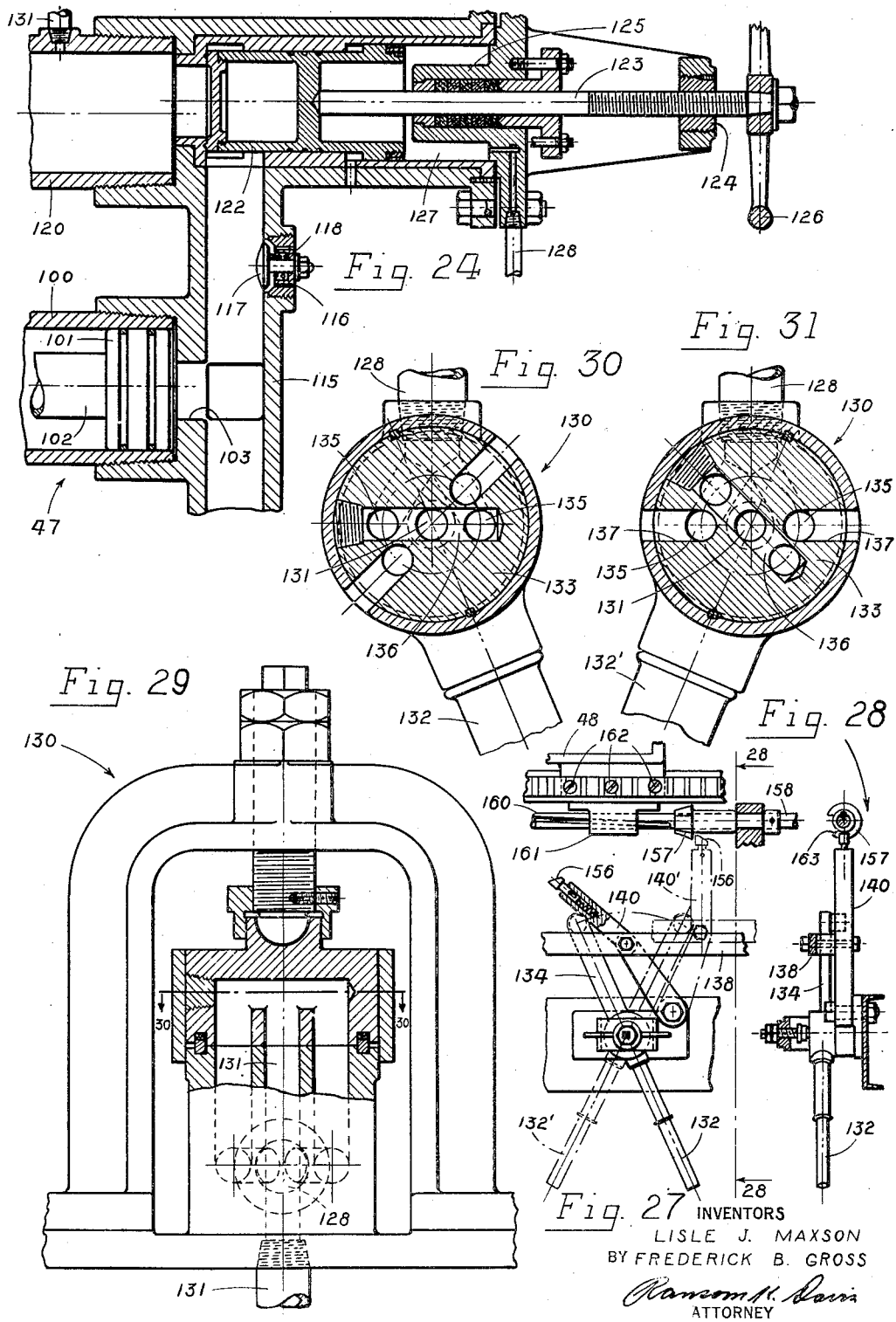

Patented Sept. 26, 1950

2,523,314

UNITED STATES PATENT OFFICE 2,523,314

FLUSH DECK CATAPULT

Lisle J. Maxson, U. S. Navy, and Frederick B. Gross, Langley, Va.

Application February 8, 1938, Serial No. 189,376

31 Claims. (Cl. 244—63)

(Granted under the act of March 3, 1883, as amended April 30, 1928; 370 O. G. 757)

This invention relates to a flush deck catapult for launching aircraft, and has for an object to provide a catapult which will serve to launch aircraft from a platform on land or atop a building or from the deck of a vessel without providing any obstruction whatsoever on the platform or the deck of the vessel, thereby allowing the platform or the deck of the vessel to be clear and available for other use whenever the catapult is not being operated.

A further object of this invention is to provide a catapult wherein the entire operating mechanism may be located beneath the platform or the deck of the launching vessel, yet the aircraft being launched will travel over the surface of the platform or deck.

Still a further object of this invention is to provide an aircraft launching catapult for launching aircraft from the platform or the deck of a vessel where the catapult, however, will not interfere with the use of the platform deck for landing thereon, especially as in aircraft carrier vessels.

Still a further object of this invention is to provide an aircraft launching catapult which may be located either longitudinally or transversely of the platform or deck of a vessel, and when located transversely of the platform or deck may launch the aircraft on either side thereof.

Still a further object of this invention is to provide an aircraft launching catapult which may be operated pneumatically and may be provided with a plurality of pneumatic reservoirs, any one of which may be selectively connected to the catapult engine for operating the same, thereby permitting the catapult to launch a series of aircraft in quick succession.

Still a further object of this invention is to provide a pneumatic means for operating a catapult engine including a high pressure pneumatic reservoir which, when opened, operates the catapult engine to the end of the stroke and is then automatically closed by the catapult engine reaching the end of its stroke to conserve any unexpended pneumatic pressure in the reservoir and thereby enable the reservoir to be restored to its initial operating position at a greater economy of time and expense.

With the foregoing and other objects in view, the invention consists in the construction, combination and arrangement of parts hereinafter described and illustrated in the drawings, in which:

Fig. 4 is a schematic view of the catapult arrangement of Fig. 1.

Fig. 5 is a partly fragmentary, partly elevational view of the catapult engine and the deck platform with an aircraft ready for launching.

Fig. 6 is a fragmentary part plan view of the catapult engine.

Fig. 7 is an enlarged side view of the sheave arrangement and rope adjuster of Fig. 5, being on line 7—7 of Fig. 8.

Fig. 8 is a sectional view on line 8—8 of Fig. 7.

Fig. 9 is a sectional view on line 9—9 of Fig. 7.

Fig. 10 is a sectional view of the platform immediately in front of the aircraft wheel chock, being on line 10—10 of Fig. 5.

Fig. 11 is a sectional view through the towing shuttle on line 11—11 of Figs. 5 and 12.

Fig. 12 is a side sectional view of the towing shuttle and showing the attaching bridle.

Fig. 13 is a side sectional view on line 13—13 of Fig. 10.

Fig. 14 is a view similar to Fig. 13 after the wheel chock has folded into the platform or deck.

Fig. 15 is a sectional view of the shuttle similar to that in Fig. 12, but after the aircraft has been launched at the end of its run.

Fig. 16 is a sectional view of the shuttle tongue on line 16—16 of Fig. 12.

Fig. 17 is an enlarged sectional view of the end of the shuttle track and the idler sheave there adjacent.

Fig. 18 is a sectional view on line 18—18 of Fig. 17.

Fig. 19 is a sectional view on line 19—19 of Fig. 17.

Fig. 20 is an enlarged sectional view of the rope tension device.

Fig. 21 is a sectional view of the engine arresting buffer.

Fig. 22 is a sectional view on line 22—22 of Fig. 21.

Fig. 23 is an end elevational view of the cylinder head end of the catapult engine, partly in section.

Fig. 24 is a sectional view of one cylinder valve and its connections to its cylinder reservoir and the engine operating piston, being on lines 24—24 of Fig. 23.

Fig. 25 is an enlarged fragmentary elevation of the firing valve cocking mechanism, being on line 25—25 of Fig. 6.

Fig. 26 is a side view of Fig. 25.

Fig. 27 is an enlarged elevational view of the firing valve cut-off enclosed within the dot dash outline 27—27 of Fig. 6.

Fig. 28 is an end elevation of the mechanism of Fig. 27 on line 28—28 of Fig. 27.

Fig. 29 is an elevational view, partly in section, of one firing valve.

Fig. 30 is a sectional view of the firing valve in the standby position on line 30—30 of Fig. 29, and Fig. 31 is a similar view of the firing valve in firing position.

Figure 1:
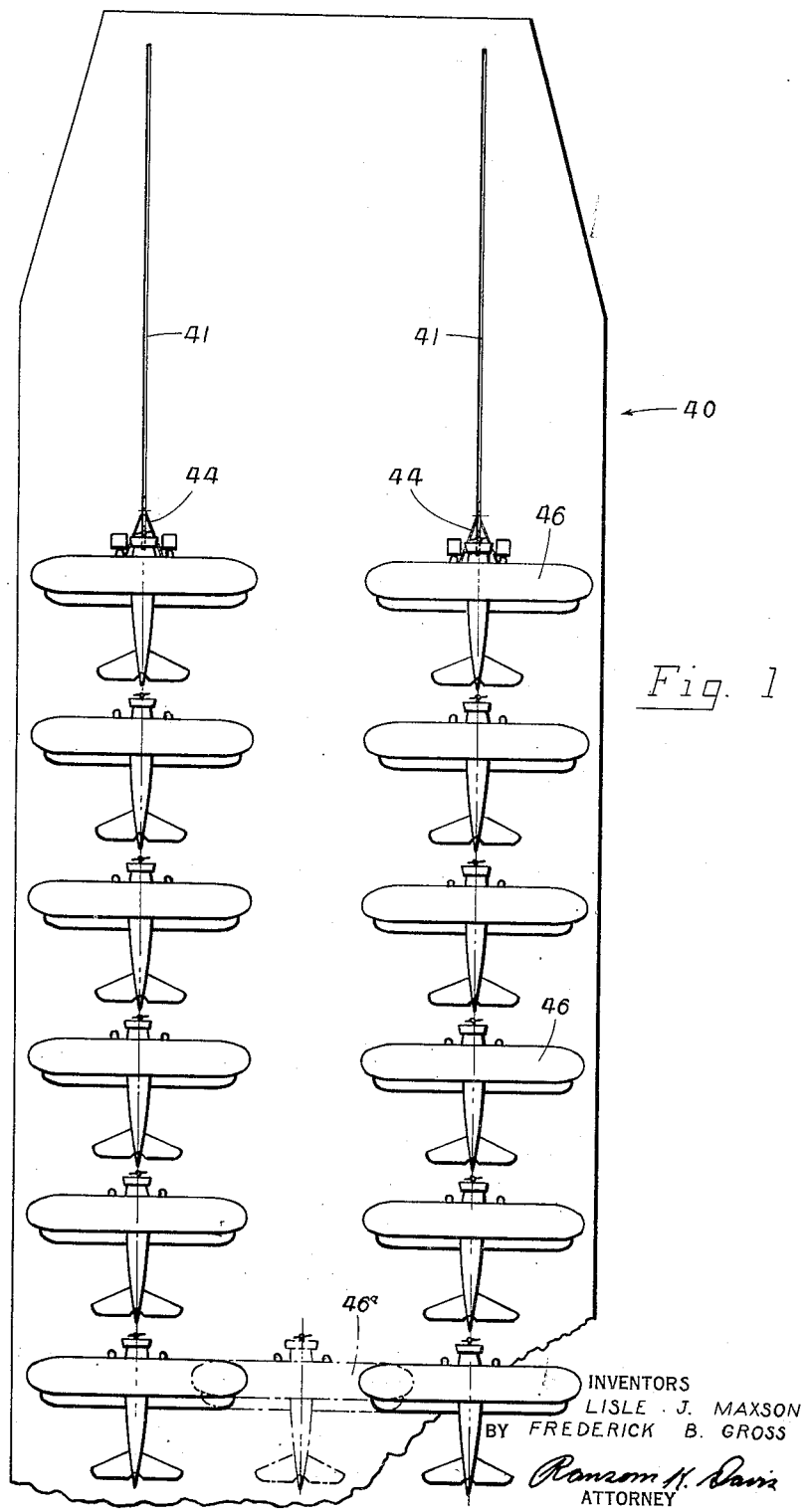
Fig. 1 is a top plan view of a land surface or building top platform or the deck of an aircraft carrier to which this invention has been applied.
Figure 2:
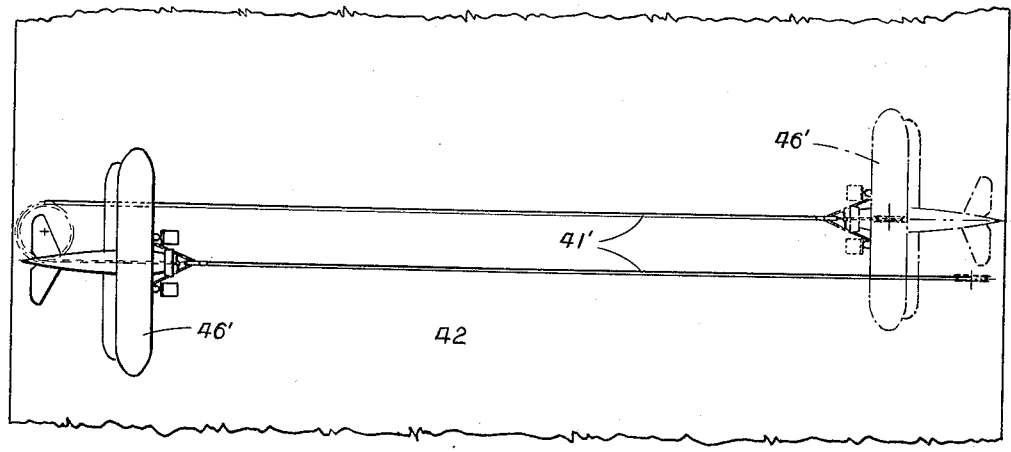
Fig. 2 is a fragmentary view of the platform or the deck of a vessel wherein the catapult operates transversely thereof in either direction.

There is shown at 40 a platform on a land surface or atop a low or high building or a deck of an aircraft carrier vessel, through one or more slots 41 of which the flush deck catapult of this invention has been applied. This slot 41 may extend longitudinally of the deck or platform, as shown in Fig. 1, or may extend transversely of the platform or vessel deck 42, as shown in Fig. 2.

Extending through the slot 41, which slot may be substantially no more than one inch in width, is a shuttle 43 to which may be secured a bridle 44 for attachment to horns 45 located at any convenient place on aircraft 46. When not in operation, the bridle may be easily removed from the deck or platform, leaving the entire operating mechanism concealed beneath the platform or deck so that the surface of the platform or desk is entirely flush and clear for other use, as for instance launching or landing aircraft 46a without interference by the catapult mechanism.

Located beneath the deck or plaftorm 40 so that the shuttle 43 will travel along the slot 41 is the catapult engine 47 for operating the carriage 48, containing the sheave arrangement 49 schematically illustrated in Fig. 4. This carriage 48 includes a plurality of carriage power sheaves 50 and a plurality of carriage return sheaves 51. Idler power sheaves 52 and idler return sheaves 53 are affixed beneath the platform or deck. A power cable 54 passes about the carriage power sheaves 50 and idler power sheaves 52, as shown, and is at one end anchored in a cable terminal clamp 55 removably received within a box 56 forming one end of the shuttle 43 and secured therein by a pin 57. The other end of the cable 54 is anchored to an adjusting screw 58 in mesh with a worm wheel 59, which in turn is meshed with a worm 60 for operation by a wrench 61, which may be temporarily extended thereto through a suitable trap door in the platform or deck. Fixed to the other end of the screw 58 is a retrieving cable 62 passing about a tension adjusting sheave 63 and then about the carriage retrieving sheave 51 and idler retrieving sheaves 53 to the other end of the shuttle 43 to which it is affixed in a similar manner by a cable terminal 63' in box 64 and held therein by pin 65.

Rotation of the wrench 61 in either direction serves to properly position shuttle 43 along slot 41 within the limits of the length of the screw 58. The cable tension sheave 63 is affixed to the end of a link 66 which passes through a bulwark 67 and threaded through a cup 68 carrying a compression spring 70 which extends about the link 66 between the inside of the cup 68 and the back of the bulwark 67. A wheel 71 formed on the cup 68 permits adjustment of the cup along the link 66, as desired, while a set screw 72 extending into a slot 73 in link 66 keeps the sheave 63 properly aligned. A nut 74 at the end of link 66 prevents the cup 68 from being unthreaded too far.

As a result of the sheave arrangement shown, the speed of the shuttle 43 is four times that of the sheave carriage 48, and if greater speed of the shuttle is desired, it may be provided by merely adding additional sets of sheaves to the carriage and to the fixed structure and suitably threading the cable thereabout.

The launching operation of the aircraft is carried out by securing the aircraft to the shuttle 43 by means of the bridle 44. The sheave carriage 48 is then operated to move longitudinally, causing the shuttle 43 to follow along in the slot 41, pulling the aircraft 46 therealong. The speed of the shuttle being multiplied over the speed of the carriage according to the number of sheaves present, the aircraft 46 will be air borne before it reaches the end of the slot 41 and will then proceed ahead of the shuttle 43, permitting the bridle 44 to fall off the horns 45 and fall to the deck or platform, bridle 44 being prevented from being lost beyond the end of the deck or platform by means of the hitch 75 secured through the eye 76 of the shuttle tongue 77. This shuttle tongue 77 is pivoted as at 78 to the shuttle body 80 and is permitted only a limited vertical movement as a result of the projecting toes 81 hitting against shoulders at the top of slots 80 in the shuttle body. This shuttle body 82 is provided with recessed channels in its opposite sides so that it may travel along tracks 83 but can neither rise upwardly nor drop downwardly therefrom. This limited movement of the tongue 77 permits its hook end 84 to extend above the surface of the deck or platform while the bridle 44 is in position thereon and on the horns 45, and to drop through the slot below the platform or deck surface level as shown in Fig. 15 when the bridle is not connecting the shuttle to the horns on the aircraft. Although the horns 45 have been shown as being mounted on the landing gear of the aircraft, it will be understood that the horns 45 may be applied at any other convenient place on the aircraft, such as on the bottom of the fuselage or elsewhere. The slot 41 being open to the weather, drain pipe 79 keeps it clear of water.

Figure 3:
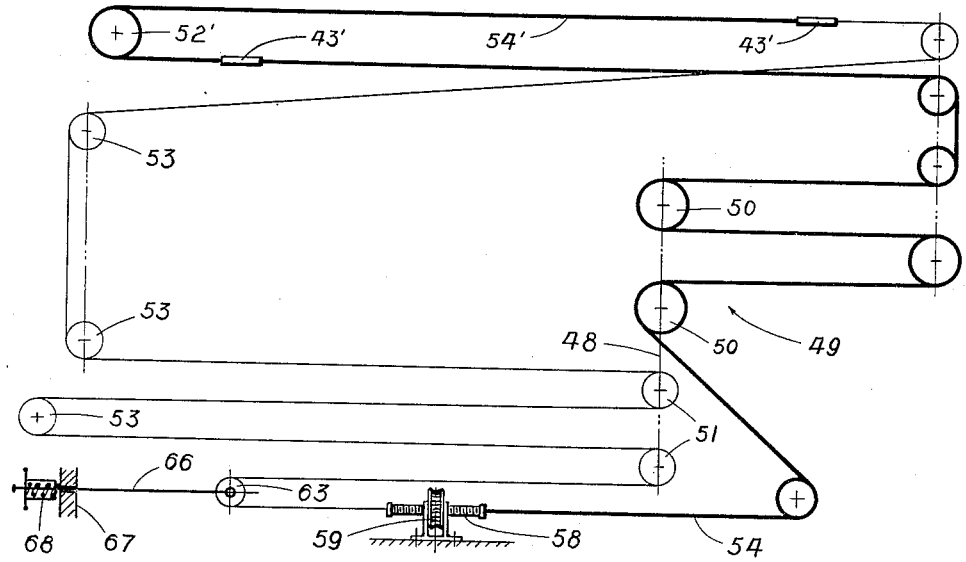
Fig. 3 is a schematic view of the catapult of Fig. 2.

In the form shown in Figs. 2 and 3, there are two slots 41' present, spaced a short distance apart, in which operate the shuttles 43', it being understood that only one of these slots may be used at a time according to the direction it may be desired to launch the aircraft 46'. Secured between the shuttles 43' is an additional cable 54' passing over an additional sheave 52' so that the bridle may be secured to either one of the shuttles 43'.

Before the carriage is moved to operate the shuttle 43 and tow the aircraft until it is airborne, it is necessary that the aircraft have its motor and propeller operating at full power, while, however, the aircraft is held stationary until the motor can be thoroughly warmed up and the launching mechanism operated. To hold the aircraft steady, wheel chocks 85 are provided properly spaced according to the spacing of the wheels 86 of the aircraft landing means, each chock being keyed on a shaft 87 which is journaled through bearings 88 on the under side of the platform surface or deck. Also keyed on shaft 87 and in alignment with the end of the slot 41 is an arm 90 having a hook 91 over which may be placed a breakable link 92, whose other end is placed over a hook 93 secured within the deck or platform 40. A hook finger 89 on arm 90 may cooperate with a cable 94, forming part of the bridle 44 and likewise securable over the hook end 84 of the shuttle tongue 77. The arm 90 is one part of the bell crank whose other arm 95 is secured to a tension spring 96 anchored to a bracket 97 below the deck or platform surface 40, and continuously urging the chock 85 to the closed flush surface position shown in Fig. 14. Such movement, however, is resisted by the presence of the breakable link 92, hooked over the hooks 91 and 93.

When launching the aircraft, wheel chocks 85 remain in blocking position until sufficient force is exerted on the sheave carriage 48 to move it and cause the shuttle 43 by means of bridle 44 and cable 94 to thus overcome the breaking strength of the link 92, causing it to break, as shown at 92' in Fig. 14, thereby permitting the wheel chocks 80 to drop to closed position, simultaneously releasing the aircraft and providing a flush surface for it to travel over.

The catapult engine 47 for moving the sheave carriage 48 consists of a cylinder 100 within which is a piston 101 operable by means of pneumatic pressure entering the end of the cylinder. The piston 101 is mounted on a piston rod 102 whose other end abuts against and is secured to the sheave carriage 48. Pneumatic pressure entering the cylinder 100 through the opening 103 serves to push the carriage sheave 48 toward the other end of its trackway 104. At the commencement of the motion an extremely high pressure is allowed to suddenly enter through the opening 103, substantially in the amount of 1000 pounds per square inch. This pressure moves the piston 101 within the cylinder 100 until the piston 101 passes beyond pressure escape openings 104 in the side of the cylinder 100 permitting the pressure to escape to the atmosphere and cease to push on the piston 101. By the time the piston 101 has reached the position of the openings 104, the shuttle will have launched the aircraft and the carriage sheave 48 will have approached the other end of its track. As it approaches such other end of the track a hammer head 105 on the other end of the carriage 48 will abut against a rod end 106 in carriage buffer mechanism 107. This rod 106 is secured to a piston 108 operable within a cylinder 110 mounted on a bracket 111. The cylinder 110 is provided with a plurality of longitudinally extending variable slots 112 in its sides, these slots 112 tapering from the forward end to its rearward end. The cylinder 110 is filled with liquid 113 which is in communication by means of slots 112 past the piston 108 with the bell 114. Above the surface of the liquid 113 the bell 114 may be filled with a moderate amount of air pressure, say approximately 30 pounds per square inch, by means of the pipe 115' from a convenient source of air pressure. When the hammer head 105 of carriage 48 hits against the rod 106 the liquid will have to flow through the slots 112 past the piston 108 and into the bell 114. Due to the small and tapering area of these slots, the travel of the piston and thus the momentum of the carriage, will be rapidly yet harmlessly absorbed. After the carriage has been stopped and retrieved to the initial launching position, the pressure in the bell 114 will be sufficient to force the liquid 113 back into cylinder 110 and restore the piston 108 to operative buffer position.

Pneumatic means is utilized for moving the carriage 48 through the medium of the rod 102 and piston 101 within cylinder 100, this pneumatic means consisting of high pressure which is admitted through the opening 103 to the cylinder 100. A spider series of conduits 115 is connected to the cylinder opening 103 and a separate pressure reservoir is connected to each leg of the spider series with individual means for opening each individual reservoir to operate the piston and with automatic means for closing the reservoir when the piston has reached the end of its stroke so as to save any unexpended pressure still within the cylinder. An individual separate pressure reservoir valve connects each individual pressure reservoir to the spider series and a pressure escape valve 116 is provided in the spider 115 in case there is any slight leakage from any of the pressure cylinders to the spider so as to prevent premature operation of the engine. This pressure escape valve 116 inclues a valve 117 held in open position by a light compression spring 118 which will allow any leakage of pressure into the spider to escape therefrom, but which will close under the high pressure present whenever an individual pressure reservoir is connected to the spider to operate the piston. Pressure escape valve 116 also permits the engine piston 101 to be restored to its initial operative position.

Each individual pressure reservoir 120 is provided with a plurality of pressure gauges 121 so that the pressure in the reservoir may be accurately measured, it being contemplated that any error in one of the gauges will be compensated by error in the other gauges, whereby the average pressure will be as close to the actual pressure as possible.

A pressure reservoir valve 122 is provided for each individual pressure reservoir 120 and mechanical means are provided for holding the valve 122 located in closed position to retain the pressure therein when early use of the catapult is not contemplated, which mechanical means may be operated to permit the valve to rapidly open or close pneumatically for operation of the engine, the opening being caused by operation of an individual firing valve which individual firing valve is automatically closed when the carriage has reached the end of its run. Mechanical means for holding the valve in closed position comprises a rod 123 threaded through a yoke 124 and passing through a stuffing box 125 where it may abut against the back of the cylinder valve 122. When remote operation of the reservoir valve is contemplated, the wheel 126 is rotated to withdraw the rod 123 until it is entirely within the stuffing box 125 and no longer mechanically prevents movement of the reservoir valve 122. This reservoir valve 122 is then held in closed position by pneumatic pressure on its back within the chamber 127, which, having the same pressure per square inch as on the face of the valve but having a greater area than on the face, naturally holds the valve in closed position until this pressure in the chamber is reduced a substantial amount. Pneumatic pressure reaches the chamber 127 through the pipe 128 and the firing valve 130 and pressure line 131 tapped into the side of the individual pressure reservoir cylinder 129. This firing valve 130 includes an operating handle 132 for moving the valve member 133 from the closed or standby position shown in Fig. 30 to the open or firing position shown in Fig. 31, while an arm 134 is provided to act as a part of the means for automatically returning the valve 133 from the open or firing position to the closed or standby position when the engine has reached the end of its stroke.

In the standby or closed position shown in Fig. 30, the pipe 128 is connected through twin openings 135 within the valve 133 through the chamber 136 to the pipe 131 so that the pressure in chamber 127 is the same as the pressure in pressure reservoir cylinder 120, thereby holding the valve 122 closed.

When the handle 132 is moved to the firing position shown in Fig. 31 chamber 136 is moved out of registration with the twin openings 135, thereby cutting off flow of pressure from the pipe 131. At the same time twin openings 137 leading to the atmosphere are moved into registration with the twin openings 135 from pipe 128, thus permitting the pressure in chamber 127 to exhaust to the atmosphere at a very rapid rate. Accordingly, moving the handle 132 to the firing position removes the pressure from chamber 127 and permits the valve 122 to open and connect reservoir 120 to cylinder 100, provided the mechanical valve locking rod 123 has first been withdrawn.

Before the firing valve can be opened, however, the cut-off mechanism must first be cocked to permit the valve to open and to thereafter be automatically re-closed. As shown in Figs. 6 and 25 to 28, a battery of individual firing valves 130 are provided, there being an individual valve for each individual reservoir. A common cocking means as well as a common locking means, is provided for this battery of firing valves. These means include a rod 138 on which is pivoted a bell crank 140 having an extending finger 141 adapted to abut against and move the rod 134 to valve closing position, the other arm of each bell crank 140 being pivoted as at 143. A compression spring 144 anchored between a bracket 145 and the end of a link 146 serves to urge one of the bell cranks 140 to valve closing position, and this motion is transmitted to each of the remaining bell cranks and valves by means of the joining rod 138. This same bell crank 140 has a toothed quadrant 147 fixed thereto, while a beveled gear 148 is held out of contact with the teeth of the quadrant by means of the spring 150. The beveled gear 148 may be brought into mesh with the teeth on quadrant 147 by pressing the operating wheel 151 thereagainst so that the quadrant may be rotated to draw all of the bell cranks 140 to cocked position out of contact with closing arms 134. If desired to lock the firing valves in closed position, a padlock 152 may be placed through a hasp 153 located on the bracket 154 and another hasp 155 carried by the quadrant 147 which is in cooperative position with the first hasp 153 only while the quadrant is in the valve closed position.

Rotation of the wheel 151 with its beveled gear 148 meshed with the quadrant 147 moves the bell cranks to cocked position. As shown in Figs. 27 and 28, one of these bell cranks 140 has a spring pressed detent 156 projecting out of the end thereof and adapted to pass behind a cam 157 to thereby hold the bell cranks 140 in the cocked position 140'. This cam 157 is fixed on a long screw 158 which has a thread 160 passing through a nut 161, the nut 161 being fixed to the carriage 48 by means of the bolts 162. The thread 160 does not make quite a full revolution in extending the length of the screw 158. After the quadrant has been operated to cock the valve and place the bell crank 140 in position 140', with the detent against the back of cam 157, the valve firing lever or handle 132 may be moved to firing position 132' at the end of the member. As soon as this is done the valve 122 opens, operating the engine 47 and moving the carriage 48 so as to actuate the shuttle to launch the aircraft. As the carriage 48 moves toward the end of its run the piston 101 reaches the end of its stroke past pressure escape openings 104 in the cylinder sides, allowing the operating pressure to escape to the atmosphere. Simultaneously, the nut 161 rotates the screw 158 so as to rotate cam 157 and bring the cam cutaway 163 in registration with the bell crank arm detent 156, thereby releasing the arm 149 and permitting the compression spring 144 to move its bell crank 140 and bell crank joining rod 138 so that each bell crank finger 141 will abut against the valve closing arm 134 of any valve that may be open and move it to valve closing position instantly.

As soon as the valve is thus moved to closed position, chamber 127 is disconnected from the atmosphere and reconnected through pipe 131 to whatever pressure is still left in its pressure reservoir cylinder 120. The pressure thus admitted to chamber 127 acts on the greater area on the back of the valve 122 and thus instantly closed the valve 122 to shut off the flow of any more pressure from pressure reservoir cylinder 120. It has been found in actual operation with this mechanism that when the initial pressure in pressure reservoir cylinder 120 is 1000 pounds per square inch at the commencement of the launching operation, the final pressure in this reservoir after the valve has been moved to closed position is 500 pounds per square inch, thus effecting a substantial economy in power and in time for restoring the pressure in the pressure reservoir cylinder to a new initial operating pressure of 1000 pounds per square inch. Meantime, the operating pressure still in engine cylinder 100 escapes through openings 104 to the atmosphere, the momentum of the carriage 48 having been absorbed by the buffer 107. A ratchet 164 carried by the carriage 48 is in mesh with a gear 165 on a shaft 166. A clutch 167 operable by a clutch arm 168 against a spring 170 for holding it in de-clutched position except when manually held in operative position, serves to restore the carriage 48 to initial operative position, under the force of an air motor 171 connected by a pipe 172 to any convenient source of air pressure. Inasmuch as the pressure in cylinder 100 drops to atmospheric pressure when the cylinder is at the end of the stroke, the valve 117 may re-open under the force of its spring 118, and the air entrapped ahead of piston 101 as the carriage is being restored to operative position may escape through valve 116. As the carriage 48 is being restored to its initial position the cable 62 simultaneously retrieves shuttle 43 back to its initial operating position adjacent the chocks 85. The broken tension bar parts 92' may then be removed and a new breaking tension bar 92 put in position to hold the chocks in wheel-blocking position, ready for launching a second aircraft.

In operation with the breaking rod 92 in chock holding position, an aircraft may be placed with its wheels thereagainst. The bridle 44 is connected over the horns on the aircraft and over the hooked tongue 84 of the shuttle, the cable 94 being also used, if desired, over the bell crank hook 89 to assist in breaking the tension bar 92, the position of the shuttle relative to the aircraft being adjusted if necessary by means of the wrench 61 and screw 58. When launching is contemplated valve locking rod 123 is withdrawn from contact against the cylinder valve 122 and quadrant lock 152 is removed from its hasp. The cocking wheel 151 is operated thereby cocking the bell crank arms 140 and permitting a selected valve 130 to be opened by its lever 132 to connect a selected pressure reservoir cylinder 120 through the spider 115 and opening 103 to operate the engine 47. At the commencement of its stroke the pressure in the engine will move the carriage to draw the shuttle and its bridle against the aircraft breaking the rod 92, thereby permitting the wheel chocks to drop to closed position and allowing the aircraft to commence its travel as the shuttle is drawn along the slot. The aircraft will be air borne by the time the engine reaches the end of its stroke, the bridle dropping off the horns of the aircraft and being held against loss by the hitch securing it to the shuttle. At the end of its stroke the pressure within the engine cylinder escapes to the atmosphere and the kinetic energy of the moving parts of the engine is absorbed by the buffer 107, while the rotation of cam 157 releases the bell cranks so that they may return the firing valve to closed position and save the unexpended pressure still within the pressure reservoir cylinder.

Clutch handle 168 is then manually moved and held in clutching position and motor 171 is operated to restore the clutch and engine to initial position and simultaneously restore the shuttle to initial position, whereupon after replacement of the breaking rod 92, the launching mechanism is again ready for operation for launching an additional aircraft. While six pressure reservoirs have been shown, it is contemplated that as many more may be connected to the spider 115 as might be necessary so that the pressure in the reservoir first used may be restored while the remaining reservoirs are being utilized, thereby making possible rapid launching of an indefinite number of aircraft.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In a catapult, the combination of a normally unobstructed platform or deck surface of which an aircraft is to be catapulted, towing means temporarily extending through slot means in the platform or deck to which the aircraft may be temporarily attached until it is air borne, guideway means for said towing means, said guideway means being below said surface, and means below the platform or deck for moving said towing means at launching speed, said slot means including a pair of approximately parallel slots extending through the platform or deck, the said towing means including towing means in each slot, means connecting together said towing means in each slot for simultaneous operation in opposite directions by said moving means, whereby an aircraft may be selectively attached to either towing means to be catapulted in the selected one of the two opposite directions.

2. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, and means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, and a retrieving cable threaded through additional carriage sheaves and additional fixed sheaves, one end of said retrieving cable being affixed to one end of the towing means and the other end of said retrieving cable being anchored.

3. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a retrieving cable threaded through additional carriage sheaves and additional fixed sheaves, one end of said retrieving cable being affixed to one end of the towing means and the other end of said retrieving cable being anchored, and an adjustable anchoring means to which the anchored ends of the towing cable and retrieving cable are affixed for adjusting the relative position of the towing means in the slot.

4. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a retrieving cable threaded through additional carriage sheaves and additional fixed sheaves, one end of said retrieving cable being affixed to one end of the towing means and the other end of said retrieving cable being anchored, a cable tensioning means including a sheave through which one of said cables is threaded and an adjustable shock absorber to which said last mentioned sheave is linked.

5. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, and a buffer in the path of said sheave carriage for absorbing its momentum at the end of its run at the end of the stroke of the engine.

6. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, and a buffer in the path of said sheave carriage for absorbing its momentum at the end of its run at the end of the stroke of the engine, said buffer including a rod against which the carriage abuts, a piston carrying said rod, a fluid filled cylinder within which said buffer piston operates, and means permitting diminishing amounts of the fluid to escape from the cylinder as the piston travels therethrough to diminish the speed thereof.

7. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a buffer in the path of said sheave carriage for absorbing its momentum at the end of its run at the end of the stroke of the engine, said buffer including a rod against which the carriage abuts, a piston carrying said rod, a fluid filled cylinder within which said buffer piston operates, means permitting diminishing amounts of the fluid to escape from the cylinder as the piston travels therethrough to diminish the speed thereof, and a pressure bell into which the fluid escapes to return the fluid to the cylinder after the carriage has been retracted from the buffer.

8. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine.

9. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine.

10. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir and a battery of firing valves, there being one firing valve for each reservoir.

11. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively conunecting any one of said pressure reservoirs through said spider conduit to operate said pressure operated engine, said selective connecting means including a balanced reservoir valve for each reservoir and a battery of firing valves, there being one firing valve for each reservoir, common means for holding said firing valves in closed position, and means for cocking said common means, permitting any of said firing valves to be operated.

12. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir and a battery of firing valves, there being one firing valve for each reservoir, common means for holding said firing valves in closed position, means for cocking said common means permitting any of said firing valves to be operated, and cam means operated by the sheave carriage releasing the cocking means at the end of the carriage run to close any open firing valve.

13. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir and a battery of firing valves, there being one firing valve for each reservoir, common means for holding said firing valves in closed position, means for cocking said common means permitting any one of said firing valves to be operated, and cam means operated by the sheave carriage releasing the cocking means at the end of the carriage run to close any open firing valve, each firing valve when opened unbalancing its reservoir valve, allowing the reservoir pressure to open the reservoir valve, each firing valve, when closed, reconnecting the pressure remaining in the pressure reservoir to the unbalanced side of the reservoir valve to close the reservoir valve and save any unexpended reservoir pressure.

14. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir and a battery of firing valves, there being one firing valve for each reservoir, common means for holding said firing valves in closed position, means for cocking said common means permitting any of said firing valves to be operated, cam means operated by the sheave carriage releasing the cocking means at the end of the carriage run to close any open firing valve, and means in the pressure operated engine permitting the operative pressure to escape at the end of its stroke.

15. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir and a battery of firing valves, there being one firing valve for each reservoir, common means for holding said firing valves in closed position, means for cocking said common means permitting any of said firing valves to be operated, cam means operated by the sheave carriage releasing the cocking means at the end of the carriage run to close any open firing valve, means in the pressure operated engine permitting the operative pressure to escape at the end of its stroke, and means for retracting the sheave carriage from the end of its run to the initial position.

16. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir and a battery of firing valves, there being one firing valve for each reservoir, common means for holding said firing valves in closed position, means for cocking said common means permitting any of said firing valves to be operated, cam means operated by the sheave carriage releasing the cocking means at the end of the carriage run to close any open firing valve, means in the pressure operated engine permitting the operative pressure to escape at the end of its stroke, means for retracting the sheave carriage from the end of its run to the initial position and retracting the engine from the end of its stroke to the initial position, and means in the spider conduit permitting pressure caused by restoration of the engine to the beginning of its stroke to escape therefrom.

17. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, power operable means below the platform or deck for moving said towing means at launching speed, chock means retractable flush to the surface of the deck or platform for temporarily holding the aircraft in initial launching position, and an element connected to said towing means and designed for temporary connection to said chock means so that the latter is retracted simultaneously with actuation of said power operable means.

18. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, chock means retractable flush to the surface of the deck or platform for temporarily holding the aircraft in initial launching position, and breakable means connected to said towing means and temporarily holding said chock means in aircraft obstructing position.

19. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, chock means retractable flush to the surface of the deck or platform for temporarily holding the aircraft in initial launching position, breakable means temporarily holding said chock means in aircraft obstructing position, means for actually rupturing said breakable means at the instant said towing means begins to move the aircraft, and yieldable means urging said chock means to flush surface retracted position upon the breaking of said breakable means.

20. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said towing means comprising a shuttle movable along said slot means, and a bridle detachably connected to said shuttle and temporarily connecting the aircraft to said shuttle means until the aircraft is air borne.

21. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said towing means comprising a shuttle movable along said slot means, and a bridle temporarily connecting the aircraft to said shuttle means until the aircraft is air borne, said shuttle means including an upwardly swingable pivoted hook normally retracted within said slot means and to which said bridle is attached.

22. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said towing means comprising a shuttle movable along said slot means, a bridle temporarily connecting the aircraft to said shuttle means until the aircraft is air borne, said shuttle means including a pivoted hook retractable within said slot means to which said bridle is attached, and means for hitching said bridle to said retractable hook to prevent loss of the bridle therefrom.

23. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir, a battery of firing valves, there being one firing valve for each reservoir, and mechanical means for individually locking each balanced reservoir valve in reservoir-sealing position.

24. In a catapult, the combination of a normally unobstructed platform or deck from the surface of which an aircraft is to be catapulted, towing means extending through slot means in the platform or deck to which the aircraft may be temporarily attached until it is air borne, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a plurality of pressure reservoirs and a spider conduit connecting each of said pressure reservoirs to said pressure operated engine, means for selectively connecting any one of said pressure reservoirs through said spider conduit to operate said pressure operated engine, said selective connecting means including a balanced reservoir valve for each reservoir, a battery of firing valves, there being one firing valve for each reservoir, and common locking means for holding the firing valves in closed position.

25. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a pressure reservoir, a balanced valve for connecting said pressure reservoir to operate said pressure operated engine, and a firing valve for unbalancing said reservoir valve to open said reservoir valve, and for rebalancing said balanced reservoir valve to thereby close said balanced reservoir valve to reservoir-sealing position.

26. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, means below the platform or deck for moving said towing means at launching speed, said means for moving said towing means at launching speed including a sheave carrying carriage, a plurality of fixed sheaves, a towing cable threaded through said carriage sheaves and fixed sheaves and connected to the towing means at one end and anchored at its other end, whereby movement of the towing means is caused by movement of said carriage, a pressure operated engine for actuating said sheave carriage, a pressure reservoir, a balanced valve for connecting said pressure reservoir to operate said pressure operated engine, a firing valve for unbalancing said reservoir valve to open said reservoir valve and for rebalancing said balanced reservoir valve to thereby close said balanced reservoir valve to reservoir-sealing position, manual means for opening said firing valve, and means automatically operated by the carriage during its run for closing said firing valve at the end of its run, to thereby close said pressure reservoir balanced valve.

27. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, and means below the platform or deck for moving said towing means at launching speed, said means for moving said towing means at launching speed including a sheave carrying carriage, a plurality of fixed sheaves, a towing cable threaded through some of said carriage sheaves and some of said fixed sheaves and connected to the towing means at one end and anchored at its other end, and a retracting cable threaded through others of said carriage sheaves and others of said fixed sheaves and connected to the other end of the towing means to which the towing cable is connected, said retracting cable being anchored at its other end whereby movement of the towing means in a launching or retracting direction is caused by movement of said carriage in a launching or retracting direction.

28. In a catapult, the combination of a normally unobstructed platform or deck from the surface of which an aircraft is to be catapulted, towing means temporarily extending through slot means in the platform or deck to which the aircraft may be temporarily attached until it is air borne, guideway means for said towing means, said guideway means being below said surface, and means below the platform or deck for moving said towing means at launching speed, said means for moving said towing means at launching speed including a sheave carrying carriage, a plurality of fixed sheaves, a towing cable threaded through some of said carriage sheaves and some of said fixed sheaves and connected to the towing means at one end and anchored at its other end, a retractable cable threaded through others of said carriage sheaves and others of said fixed sheaves and connected to the other end of the towing means to which the towing cable is connected, said retracting cable being anchored at its other end whereby movement of the towing means in a launching or retracting direction is caused by movement of said carriage in a launching or retracting direction, there being a common anchoring means for the anchored ends of said towing cable and said retracting cable, and means for adjusting said anchoring means whereby the position of said towing means is adjusted relatively in said slot means.

29. In combination with a normally unobstructed aircraft landing and launching platform or deck, means in the platform or deck for temporarily obstructing an aircraft thereagainst having its power means in full operation, and means below the platform or deck for augmenting the aircraft power means to overcome the temporary obstructing means and tow the aircraft until it is air borne, said aircraft temporary obstructing means comprising wheel chocks retractable flush into the surface of the deck or platform.

30. In combination with a normally unobstructed aircraft landing and launching platform or deck, means in the platform or deck for temporarily obstructing an aircraft thereagainst having its power means in full operation, means below the platform or deck for augmenting the aircraft power means to overcome the temporary obstructing means and tow the aircraft until it is air borne, said aircraft temporary obstructing means comprising wheel chocks retractable flush into the surface of the deck or platform, and breakable means holding the wheel chocks in obstructing position and that readily can be ruptured when the augmenting power means is added to the aircraft power means.

31. In combination with a normally unobstructed aircraft landing and launching platform or deck, means in the platform or deck for temporarily obstructing an aircraft thereagainst having its power means in full operation, means below the platform or deck for augmenting the aircraft power means to overcome the temporary obstructing means and tow the aircraft until it is air borne, said aircraft temporary obstructing means comprising wheel chocks retractable flush into the surface of the deck or platform, breakable means holding the wheel chocks in obstructing position until the augmenting power means is added to the aircraft power means, and yieldable means urging the wheel chocks toward flush retracted position.

LISLE J. MAXSON.
FREDERICK B. GROSS.

REFERENCES CITED

The following references are of record in the file of this patent:

UNITED STATES PATENTS

| Number | Name | Date |
|---|---|---|
| 922,711 | Means | May 25, 1909 |
| 1,415,847 | Sperry | May 9, 1922 |
| 1,440,812 | Beasley | Jan. 2, 1923 |
| 1,734,353 | Sperry | Nov. 5, 1929 |
| 1,765,210 | Daniel | June 17, 1930 |
| 1,846,157 | Stevens | Feb. 23, 1932 |
| 1,930,473 | Fellers | Oct. 17, 1933 |
| 1,963,081 | Fellers | June 19, 1934 |
| 1,997,945 | Olaszy | Apr. 16, 1935 |
| 2,070,721 | Feight | Feb. 16, 1937 |

FOREIGN PATENTS

| Number | Country | Date |
|---|---|---|
| 292,826 | Great Britain | June 28, 1928 |
| 650,925 | France | Feb. 12, 1929 |

Certificate of Correction

September 26, 1950

Patent No. 2,523,314

LISLE J. MAXSON ET AL.

It is hereby certified that error appears in the printed specification of the above numbered patent requiring correction as follows:

Column 9, line 56, before the word "surface" insert *from the*; and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*